(12) United States Patent
Faltings

(10) Patent No.: US 6,631,947 B2
(45) Date of Patent: Oct. 14, 2003

(54) SHOCK-ABSORBING BICYCLE SEAT MOUNT SYSTEM

(76) Inventor: John Philip Faltings, 2600 Park Ave.-10 H, Bridgeport, CT (US) 06604

( * ) Notice: Subject to any disclaimer, the term of this patent is extended or adjusted under 35 U.S.C. 154(b) by 0 days.

(21) Appl. No.: 09/752,086

(22) Filed: Dec. 29, 2000

(65) Prior Publication Data

US 2001/0006301 A1 Jul. 5, 2001

Related U.S. Application Data (63) Continuation-in-part of application No. 09/428,436, filed on Oct. 21, 1999, now abandoned, which is a continuation-in-part of application No. 09/253,113, filed on Feb. 19, 1999, now abandoned.
(60) Provisional application No. 60/075,350, filed on Feb. 20, 1998.

(51) Int. Cl.$^7$ .................................................. B62J 1/06
(52) U.S. Cl. .............................. 297/195.1; 297/215.14
(58) Field of Search .................... 291/195.1, 215.14, 291/208, 209, 215.13; 248/188.5; 403/109.3, 109.6

(56) References Cited

U.S. PATENT DOCUMENTS

| 510,993 | A | * | 12/1893 | Riess | 297/215.13 |
| 5,044,592 | A | * | 9/1991 | Cienfuegos | 297/215.13 |
| 5,387,025 | A | * | 2/1995 | Denisar | 297/201 |

FOREIGN PATENT DOCUMENTS

| FR | 2280299 | * | 2/1976 | 248/188.5 |
| GB | 2116128 | * | 9/1983 | 297/215.13 |
| SU | 1150145 | * | 2/1985 | 297/195.1 |

* cited by examiner

Primary Examiner—Peter R. Brown (57) ABSTRACT

In a preferred embodiment, a shock-absorbing bicycle seat mount, including: a post fixedly attached to a bicycle seat at a proximal end of the post, a distal end of the post being inserted into a bicycle seat tube for axial movement therein; biasing apparatus disposed within the seat tube to support the post and provide a cushioning action for the post and the bicycle seat; and apparatus to prevent rotational movement of the post within the seat tube.

7 Claims, 12 Drawing Sheets

SHOCK-ABSORBING BICYCLE SEAT MOUNT SYSTEM

CROSS-REFERENCE TO RELATED APPLICATIONS

The present application is a continuation-in-part of U.S. application Ser. No. 09/428,436, filed Oct. 21, 1999, and titled SHOCK-ABSORBING BICYCLE SEAT MOUNT, now abandoned which is a continuation-in-part of U.S. application Ser. No. 09/253,113, filed Feb. 19, 1999, and titled A SHOCK ABSORBING BICYCLE SEAT MOUNT, abandoned. The present invention was described, in part, in Disclosure Document No. 423458, date stamped Aug. 19, 1997. Benefit is claimed of the filing date of U.S. Provisional Application Serial No. 60/075,350, filed Feb. 20, 1998, and titled BICYCLE SLOTTED SEAT POST.

BACKGROUND OF THE INVENTION

1. Field of the Invention

The present invention relates to bicycles generally and, more particularly, but not by way of limitation, to a novel shock-absorbing bicycle seat mount.

2. Background Art

Ordinarily, bicycle (bike) seats are supported on a post that is tightly clamped in a bike seat tube portion of a bike frame. This is true for movable bicycles and also for stationary, exercise, bikes. Seat height location is provided by a certain extension of the seat post upwardly and outwardly from the tube. At a post height extension for a particular rider's desired seat height, a clamp located at the top of the tube is tightened to prevent any dislocation movement of the seat post. Thus, the seat post becomes, in effect, integral with the rigid bike frame which ordinarily does not provide for any road mechanical shock absorption other than that absorbed by the bike's inflated rubber tires and front fork shock absorbers when the latter are provided.

It would be desirable, therefore, to have the seat post supported on a compression coil spring inside the tube so that some of the imparted road shock would be absorbed by that spring. A seat post that would be enabled to move in a quasi-vertical motion along the longitudinal axis of and inside the seat tube unrestricted by a tightened clamp as described above but restricted as to it's rotational, "swivel", motion is preferentially required for this desired shock absorbing effect.

Accordingly, it is a principal objective of the present invention to provide a shock-absorbing bicycle seat mount that absorbs imparted road shock.

It is a further objective of the invention to provide such a bicycle seat mount that prevents rotational motion of the bicycle seat mount.

It is an additional objective of this invention to provide such a bicycle seat mount that can either be retrofitted to an existing bicycle or incorporated in the bicycle at the time of manufacture of the bicycle.

It is another objective of this invention to provide such a bicycle seat mount that can be economically constructed.

It is yet a further objective of this invention to provide such a bicycle seat mount that can be easily installed in a seat tube and attached thereto.

Other objectives of the present invention, as well as particular features, elements, and advantages thereof, will be elucidated in, or be apparent from, the following description and the accompanying drawing figures.

SUMMARY OF THE INVENTION

The present invention achieves the above objectives, among others, by providing, in a preferred embodiment, a shock-absorbing bicycle seat mount, comprising: a post fixedly attached to a bicycle seat at a proximal end of said post, a distal end of said post being inserted into a bicycle seat tube for axial movement therein; biasing means disposed within said seat tube to support said post and provide a cushioning action for said post and said bicycle seat; and means to prevent rotational movement of said post within said seat tube.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 1A:
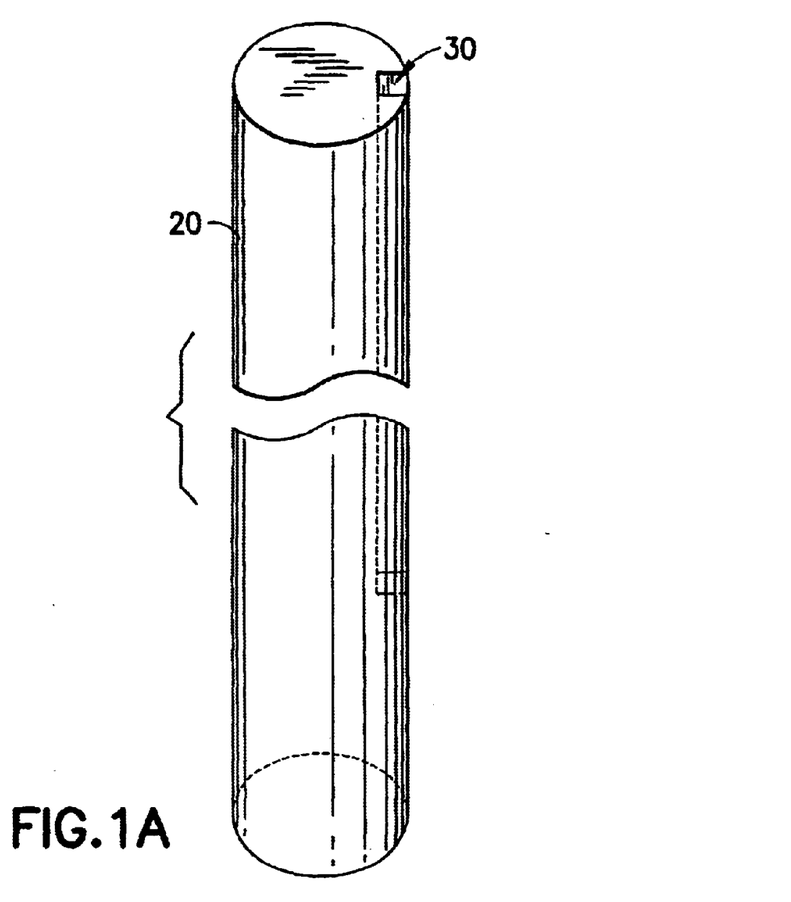
FIGS. 1A, 1B, and 1C are isometric, top plan, and bottom plan views, respectively of a seat post constructed according to one embodiment of the present invention.
Figure 1B:
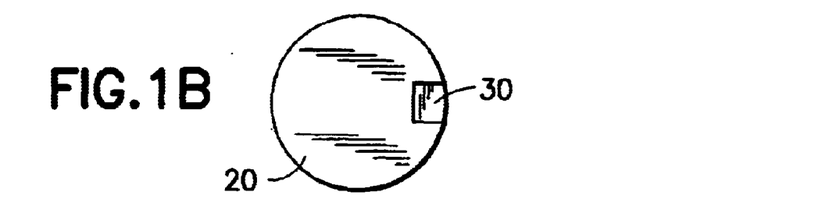
Figure 1C:
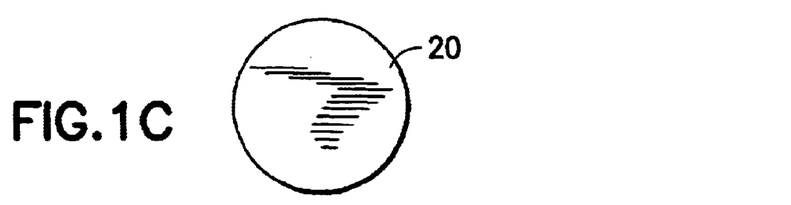

FIGS. 1A, 1B, and 1C illustrate a bicycle seat post 20 constructed according to one embodiment of the present invention. Bicycle seat post 20 is an elongated cylindrical member, preferably constructed of a suitable metallic or polymeric material, and having a vertically extending slot 30 defined therein. Slot 30 is open at the top end of bicycle seat post 20 and extends downwardly to nearly the bottom of the bicycle seat post. While not shown on the present figures, slot 30 is provided so that protrusion means (not shown) may extend therein and thus prevent rotational movement of the bicycle seat post, while permitting up and down motion of the bicycle seat post. It will be understood that lower end of bicycle seat post 20 is inserted in a bicycle seat tube and the upper end of the bicycle seat post is clamped to a bicycle saddle (neither shown). Slot 30 only approaches the bottom of bicycle seat post 20 such that the bottom of the slot serves as a stop to prevent the bicycle seat post from unintentionally being ejected from the bicycle seat tube.

Figure 2:
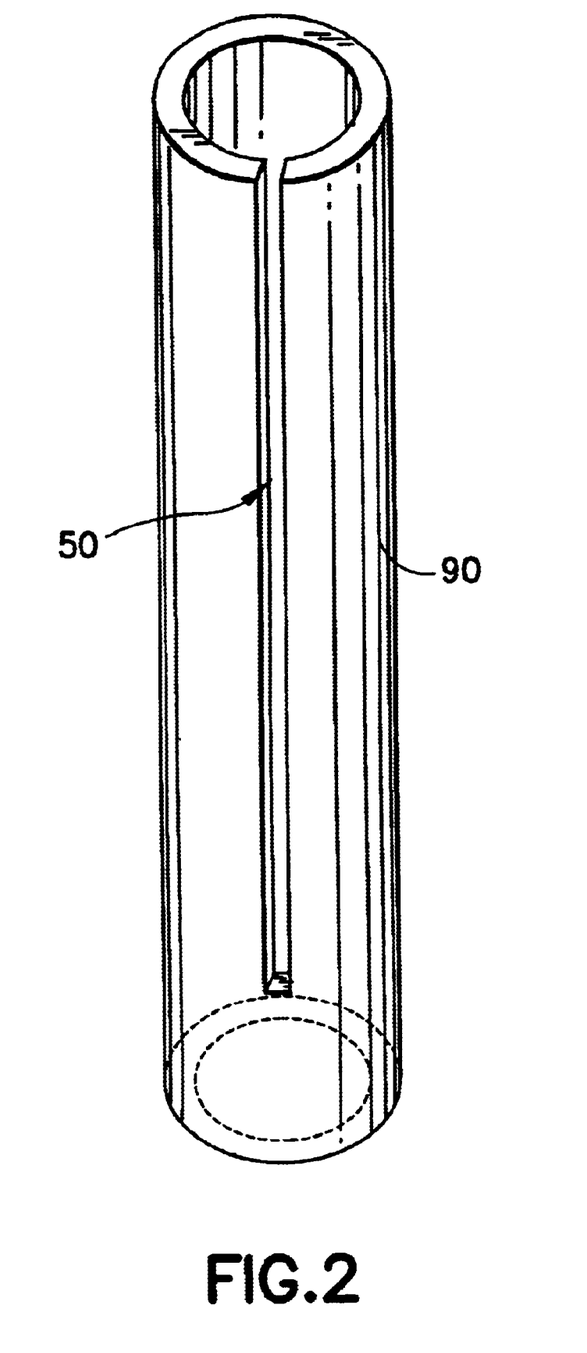
FIG. 2 is an isometric view of another embodiment of a seat post constructed according to the present invention.

FIG. 2 illustrates a bicycle seat post 40 constructed according to another embodiment of the present invention. Bicycle seat post 40 is an elongated, hollow cylindrical member and has a vertical slot 50 defined through the wall thereof for the same purpose as slot 30 (FIG. 1). Although exact dimensions will depend on the application, bicycle seat post 40 is typically about 14 inches in length. Similar to slot 30 (FIG. 1A), slot 50 only approaches the bottom of bicycle seat post 40 for the same purpose as described above.

Figure 3A:
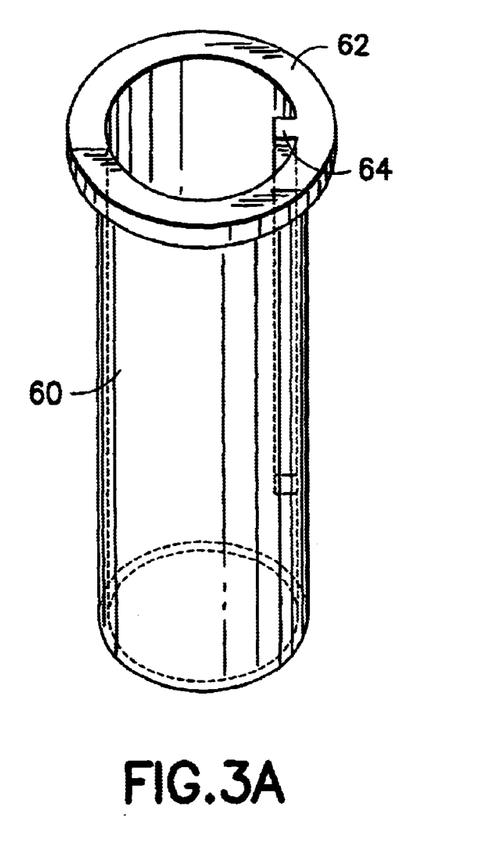
FIGS. 3A and 3B are isometric views of elements to prevent rotation of a seat post within a seat tube.

FIG. 3A illustrates an elongated, hollow, cylindrical insert 60 for insertion between a bicycle seat post and a bicycle seat tube (neither shown), the cylindrical insert including a flange 62 formed around the upper end of the cylindrical insert to permit the cylindrical insert to rest on the upper end of the bicycle seat tube and a vertical protrusion 64 integral with an inner surface of the cylindrical insert. With protrusion 64 inserted, for example, in slot 50 of bicycle seat post (FIG. 2) and with cylindrical insert held immobile with respect to the bicycle seat tube, the bicycle seat post will be able to move vertically with respect to the bicycle seat tube, but will be restrained from rotational movement with respect thereto. Protrusion 64 may be molded in one piece with cylindrical insert 60 or it may be attached thereto by suitable means.

Figure 3B:
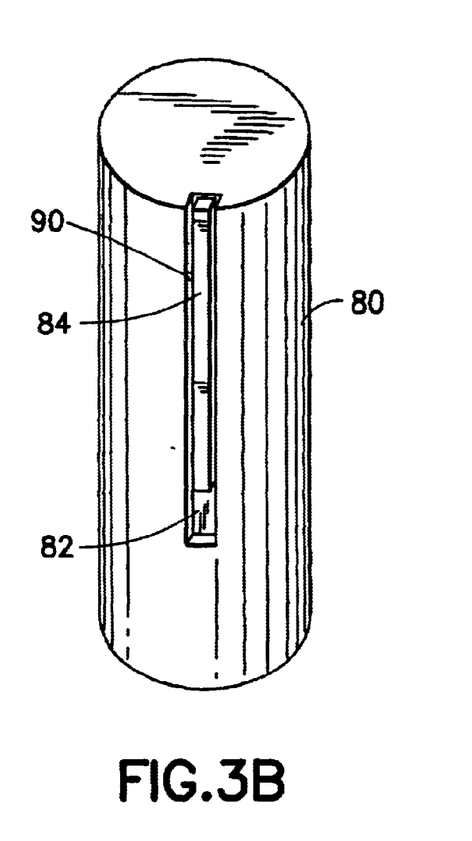

FIG. 3B illustrates a solid bicycle seat post 80 having a vertical slot 82 defined therein. A vertical protrusion 84 is shown as being disposed in slot 82. Protrusion 84 may be integrally molded with or otherwise be an integral aspect of a surrounding cylindrical insert (not shown) such as cylindrical insert 60 (FIG. 3A) or it may be attached thereto by suitable means. A plurality of ball or roller bearings, as at 90, is disposed between and in contact with adjacent surfaces of slot 82 and protrusion 84 to reduce the friction therebetween. Of course, other anti-friction means may be provided as well.

Figure 4:
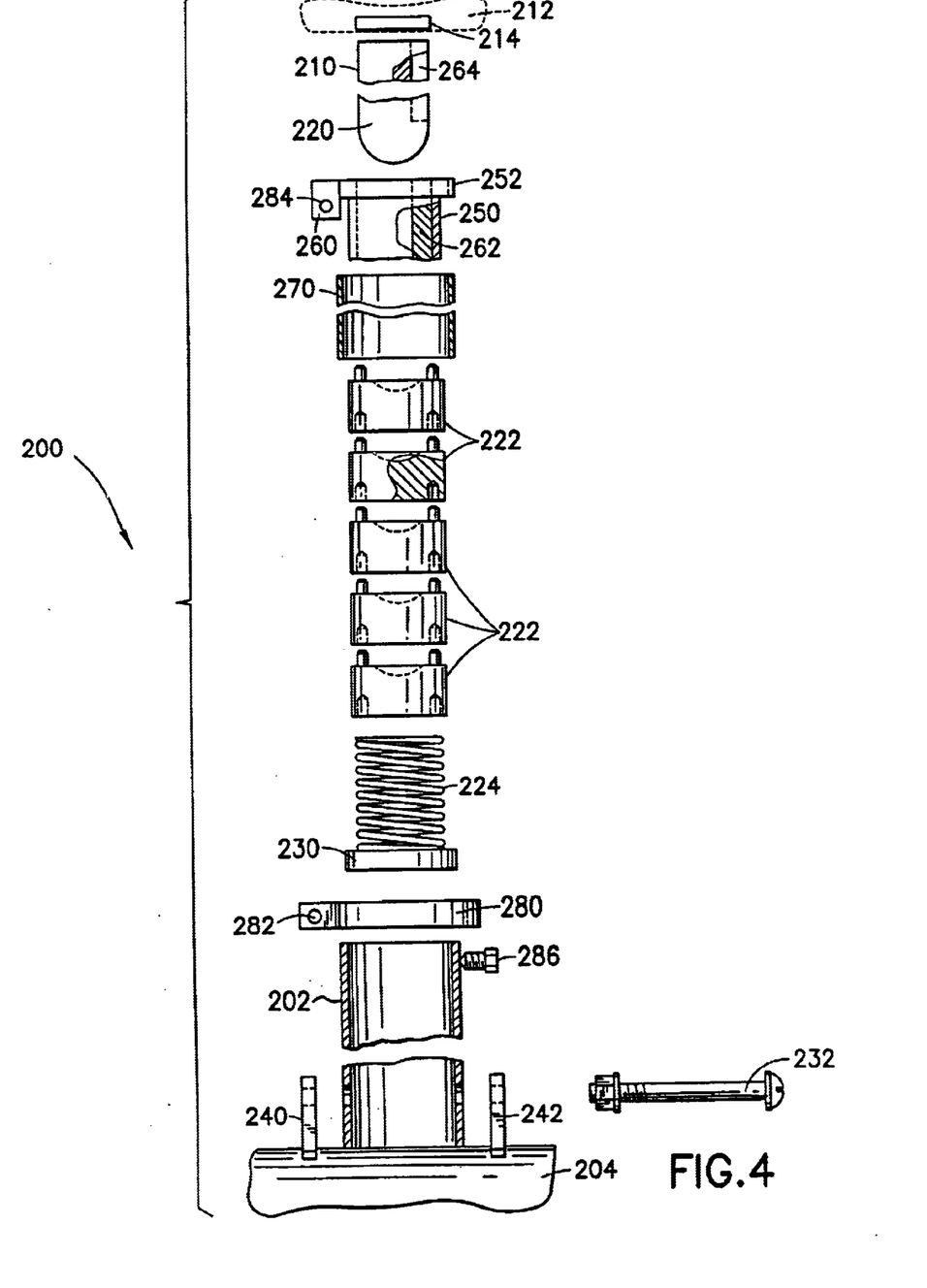
FIG. 4 is a an exploded front elevational view, partially in cross-section, of a shock-absorbing bicycle seat mount according to the present invention.

FIG. 4 illustrates a shock-absorbing bicycle seat mount, constructed according to the present invention, generally indicated by the reference numeral 200, and inserted in a bicycle seat tube 202.

Seat mount 200 includes a bicycle seat post 210 having its upper end clamped to a bicycle saddle 212 with a variable thickness collar 214. The lower end 220 of bicycle seat post 210 is rounded and engages the upper end of a rounded cylindrical spacer block 222. Lower end 220 may instead be provided flat and the spacer block 222, in that case, would also be flat. A series of such spacer blocks, which may be interfitting or in a simple "top-to-bottom" surface area contact, is provided so that one or more may be selected as needed to provide the necessary vertical spacing for a rider's preference in conjunction with the length of bicycle seat tube 202 of a particular bicycle. The bottom surface of the lowest spacer block 222 engages a compression spring 224. The lower end of compression spring 224 rests on a resilient, circular, vibration eliminator support block 230 which is supported by a bolt 232 extending through the walls of bicycle seat tube 202. In order to provide support for seat mount 200 in addition to that provided by bicycle seat tube 202, bolt 232 extends through the upper ends of two support pillars 240 and 242 which have their lower ends engaging the upper surface of hub 204 to transfer the downward force generated by the seat mount to the stronger hub.

A cylindrical insert 250 having a supporting flange 252 is disposed around bicycle seat post 210. Depending from the lower side of flange 252 is an integral tab 260. Cylindrical insert 250 also includes a lengthwise protrusion 262 for engagement with surface(s) of a lengthwise slot 264 on the inside surface of bicycle seat post 210. If needed to retrofit a bicycle with the present invention, a spacer sleeve 270 having the required thickness is snugly disposed between the outer surface of cylindrical insert and the inner surface of bicycle seat tube 202. When seat mount 200 is furnished for retrofitting, spacer sleeve 270 may be the tubular plastic packaging in which the elements of the seat mount are sold, with the sleeve cut to the proper length after removal therefrom of the other elements of seat mount 200.

A ring clamp 280 is provided for clamping around bicycle seat tube 202 and tab 260 is arranged such that, when a suitable fastener (not shown) is inserted through a pair of aligned holes 282 defined through the ends of the ring clamp, the fastener will also be inserted through a hole 284 defined through the tab, thus preventing swivel, lateral rotation of cylindrical insert 250 within bicycle seat tube 202 after its position therein has been fixed by tightening the fasteners. A self-tapping screw 286 is inserted through bicycle seat tube 202 into protrusion 262 to secure the elements together, as an optional or additional means to prevent swivel.

As noted above, shock-absorbing bicycle seat mount 200 may be installed during manufacture of the bicycle or it may be retrofitted to an existing bicycle. In the former case, bolt 232 may be replaced with a disk (not shown) welded to the inner surface of bicycle seat tube 202. In the latter case, the existing bicycle seat post is removed from bicycle seat tube 202, holes are drilled through the bicycle seat tube for screw 286 and bolt 232, bolt 232 is installed, the internal components of bicycle seat mount 200 are inserted in the bicycle seat tube, and screw 286 is inserted. Tab 260 is attached to ring clamp 280 previously slid over the outside surface of bicycle seat tube 202. The thickness of spacer sleeve 270 and lengths and quantity of spacer blocks 222 are selected for the specific installation.

The outside diameter of cylindrical insert 250 is selected such that it will fit into the bicycle seat tube of any standard bicycle and the inner diameter of the cylindrical insert is selected to closely fit bicycle seat post 210. Spacer sleeve 270 then snugly fills in the annular space defined between the outer surface of cylindrical insert sleeve 250 and the inner surface of bicycle seat tube 202, thus accommodating bicycle seat tubes having different inner diameters.

Figure 5A:
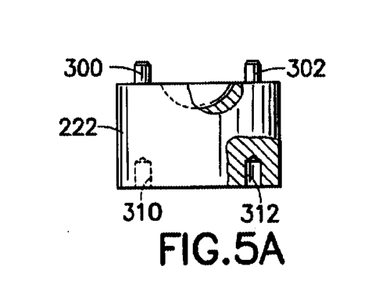
FIGS. 5A, 5B, and 5C are side elevational, bottom plan, and top plan views, respectively, of a spacer block for use with the embodiment of FIG. 4.
Figure 5B:
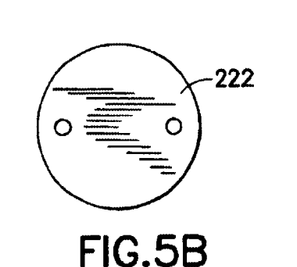
Figure 5C:
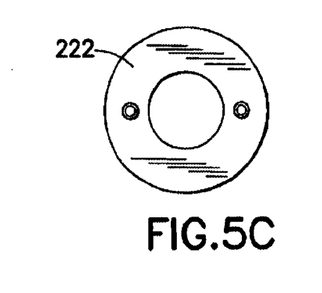

FIGS. 5A, 5B, and 5C illustrate a cylindrical spacer 222. Spacer 222 includes a rounded depression 290 defined in the upper surface thereof into which lower end 220 of bicycle seat post 210 (FIG. 4) can be supportingly inserted. Rising upwardly from the upper surface of spacer block 222 are two pins 300 and 302 which are dimensioned to fit into complementarily dimension holes on another spacer block. Likewise, spacer block 222 has defined in the lower surface thereof two holes 310 and 312 to accept therein similar pins from another spacer block. Thereby, a chain of spacer blocks 222 is locked together.

Figure 6:
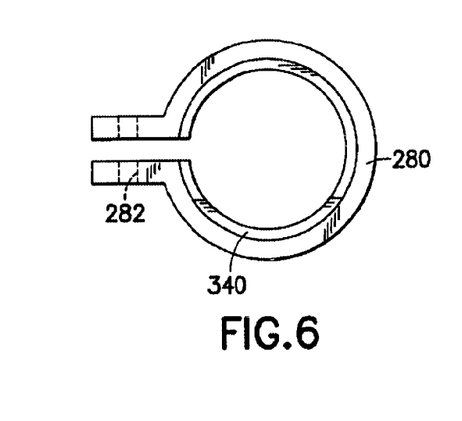
FIG. 6 is a top plan view of a ring clamp for use with the embodiment of FIG. 4.

FIG. 6 illustrates ring clamp 280 and shows hole 282 defined therethrough. Also shown are one or more layers of double-sided adhesive tape 340 disposed on the inside of ring clamp 280 provided so that swivel prevention can be further provided and so that a single ring clamp can be used with bicycle tube seats of different diameters by proper selection of the number of layers of the double-sided adhesive tape used.

Figure 7A:
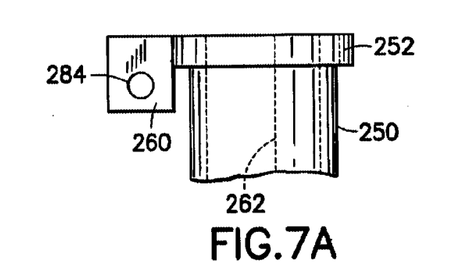
FIGS. 7A, 7B, and 7C are side elevational, top plan, and bottom plan views, respectively, of a cylindrical insert for use with the embodiment of FIG. 4.
Figure 7B:
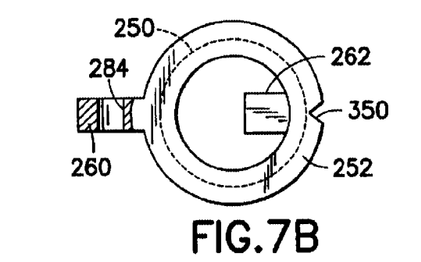
Figure 7C:
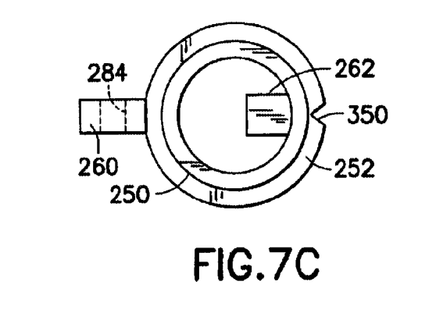

FIGS. 7A, 7B, and 7C illustrate the upper end of cylindrical insert 250 and the features thereof described above. In addition, there is shown a locator notch 350 that serves as a "target" and is used to locate self-tapping screw 286 to assure that it becomes accurately inserted in protrusion 262.

Figure 8:
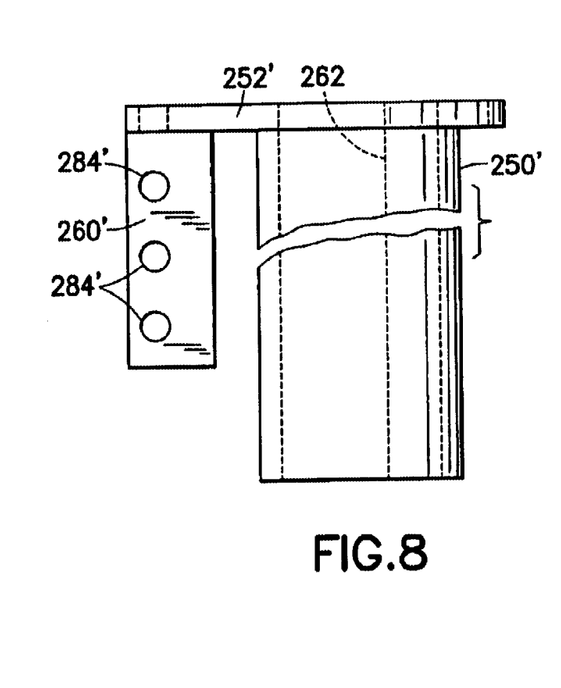
FIG. 8 is a side elevational view of a cylindrical insert for use with the embodiment of FIG. 4.

FIG. 8 illustrates an alternative embodiment of a cylindrical insert for use with bicycle seat mount 200 (FIG. 4), here, cylindrical insert 250'. Cylindrical insert 250' includes a horizontal flange 252' formed around the upper edge thereof and a tab 260' depending from the flange. Tab 260' includes three holes 284' defined therethrough and vertically spaced apart. This arrangement is particularly advantageous when a system of bicycle seat mount 200 (FIG. 4) is to be retrofitted to an existing bicycle. The plurality of holes 284' permits one to be chosen such that ring clamp 280 (FIG. 4) may be positioned away from any interfering structure on bicycle seat tube 202.

Figure 9:
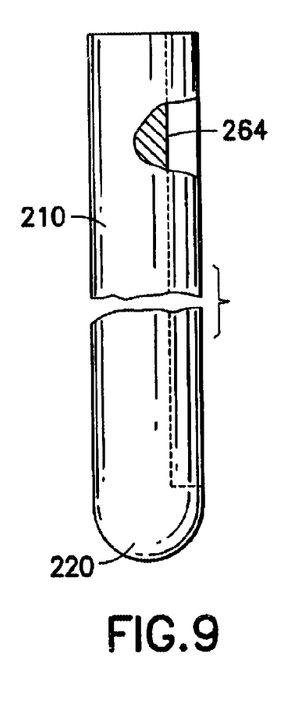
FIG. 9 is a side elevational view of a seat post for use with the embodiment of FIG. 4.

FIG. 9 illustrates bicycle seat post 210 and shows slot 264 and rounded bottom end 220.

Figure 10:
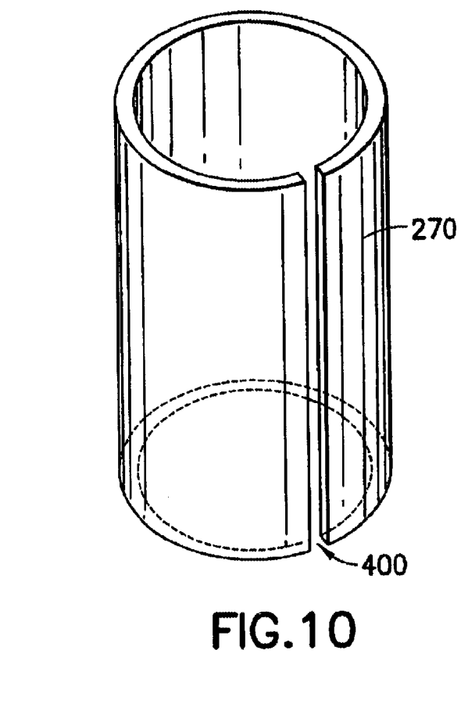
FIG. 10 is an isometric view of a spacer sleeve for use with the embodiment of FIG. 4.

FIG. 10 illustrates spacer sleeve 270 and shows that the spacer sleeve may have a vertical slot 400 defined through the wall thereof and extending fully from the top to the bottom of the spacer sleeve. This permits a single spacer sleeve 270 to accommodate varying diameters of cylindrical insert 250 that may be provided and also aids when it is necessary to employ more than one spacer sleeve.

Figure 11:
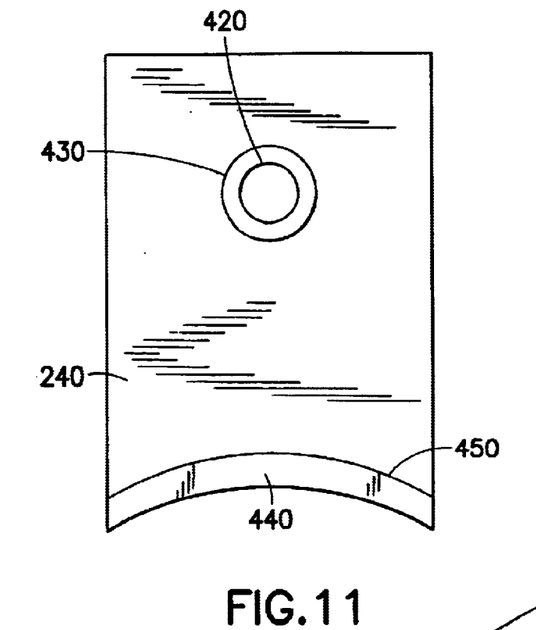
FIGS. 11 and 12 are side elevational and front elevational views, respectively, of a support pillar for use with the embodiment of FIG. 4.
Figure 12:
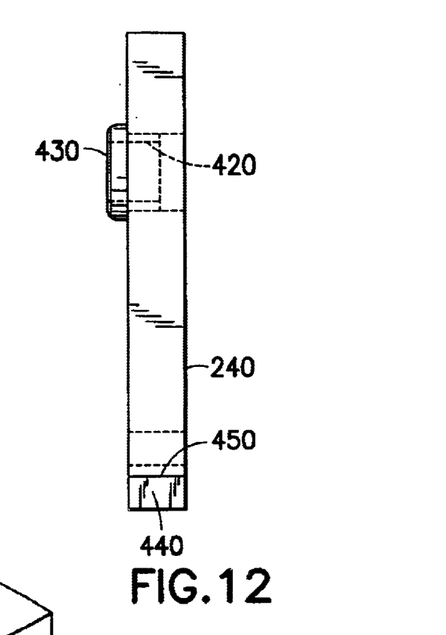

FIGS. 11 and 12 illustrate support pillar 240 with a hole 420 defined therethrough for bolt 232 (FIG. 4) and further show a resilient grommet 430 inserted in hole 420 and a resilient strip 440 disposed along a curved lower edge 450 of the support pillar. Grommet 430 and strip 440 are provided to ensure a snug fit of the components and the grommet also serves to exclude dirt and other foreign material from the interior of bicycle seat tube 202. Support pillar 240 may also be arcuate such that it reinforces the lower end of bicycle seat tube 202 (FIG. 4).

Figure 13:
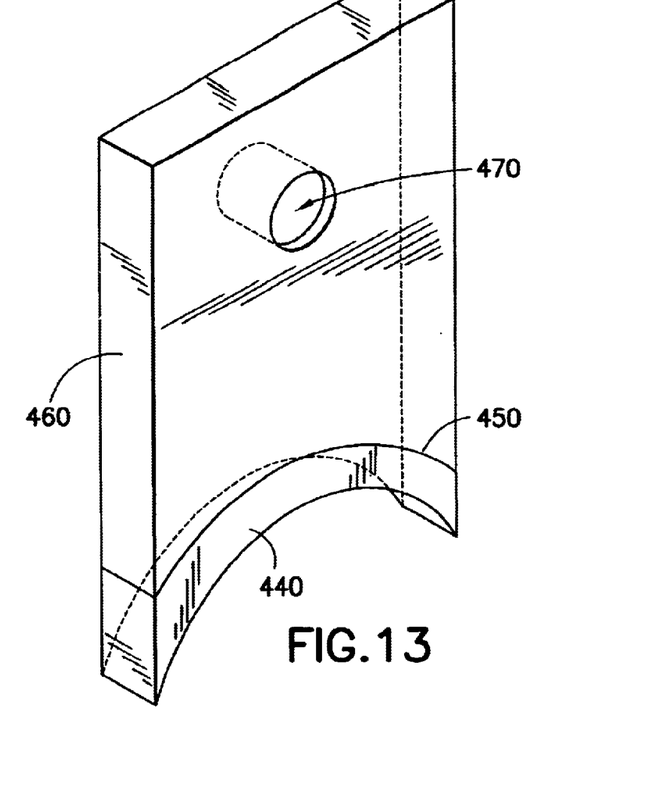
FIG. 13 is an isometric view of a support pillar cover for use with the embodiment of FIG. 4.

FIG. 13 illustrates a generally hollow support pillar cover 460, having a hole 470 defined therethrough, that may be disposed over support pillar 240 (FIG. 11). When used, support pillar cover is provided for a more finished appearance and to protect the support pillar.

Figure 14:
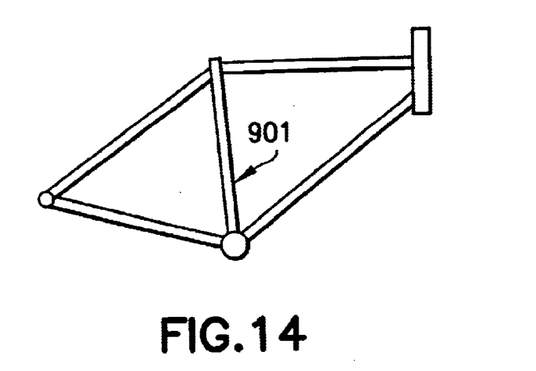
FIG. 14 depicts a typical bicycle structural frame with the seat tube identified.

FIG. 14 is a side view of a typical bicycle frame with a seat tube 901.

Figure 15A:
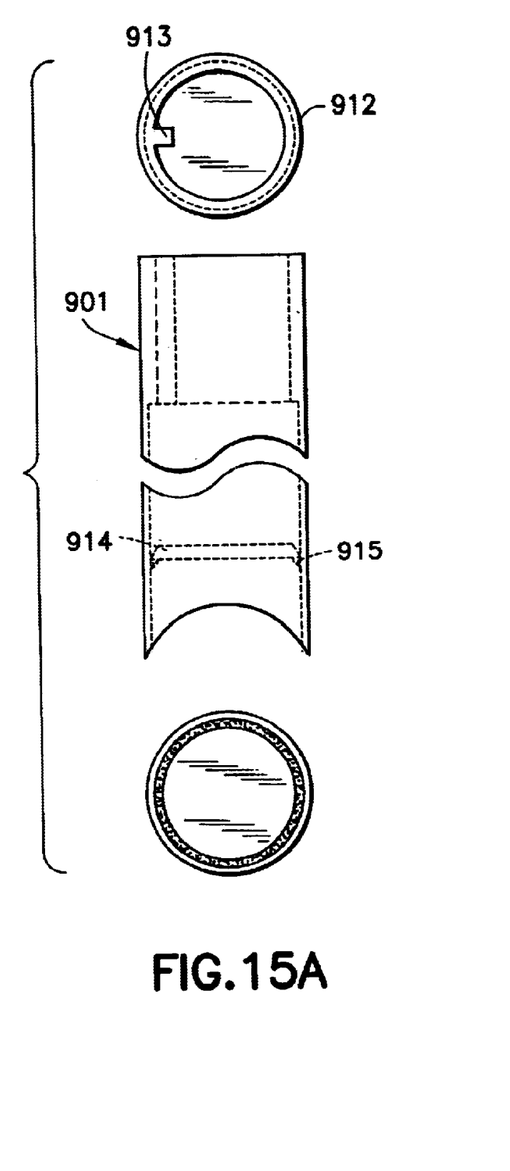
FIG. 15A is a side elevation, top plan and bottom plan view of a seat tube with a fixed internal load support platform.

FIG. 15A is top view, side elevation view and bottom view of seat tube 901. The top view shows integral annular space configuration 912 at the upper portion of seat tube 901 with a longitudinal surface that forms integral key 913 protruding inward from that surface for reception of a dimensionally conforming slotted seat post such that the inserted seat post is guided in unrestricted but true longitudinal motion within seat tube 901 but restricted from rotational, lateral motion within it.

The side elevation view shows the longitudinal aspect of annular space 912 with key 913 and a plug platform 914 diametrically across the interior of a lower portion of the seat tube secured in place by weldment 915. Platform 914 is a load support for the seat post and any biasing means and system ancillary components within seat tube 901.

The bottom view shows the underside of platform 914 and it's perimeter weld.

Figure 15B:
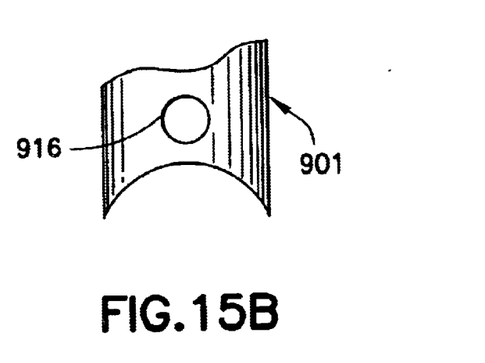
FIGS. 15B and 15C are side elevation views of alternative lower portions of the seat tube shown in FIG. 15A with openings which allow for outward insertion of a load support platform diametrically across the seat tube in lieu of the platform shown in 15A.
Figure 15C:
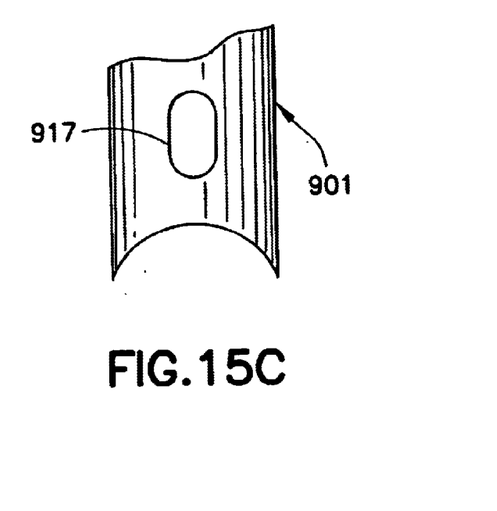

FIGS. 15B and 15C illustrate the lower portion of seat tube 901 with design alternatives to the interior fixed welded platform of FIG. 15A.

FIG. 15B is a side elevation view of a lower portion of seat tube 901 with diametrically opposite round holes 916 through the wall for insertion of a bolt or similar interior load bearing platform means.

FIG. 15C is a side elevation view of a lower portion of seat tube 901 with diametrically opposite, longitudinally oriented, oblong slots 917 for insertion of of a movable load bearing platform means having ends that extend outward of and unconnected to the wall of seat tube 901 but which may be connected to a means in tension exterior to seat tube 901 that is connected to any upper portion of the bicycle frame such that the platform is movable longitudinally within the confines of the otherwise restrictive openings 917.

Figure 16A:
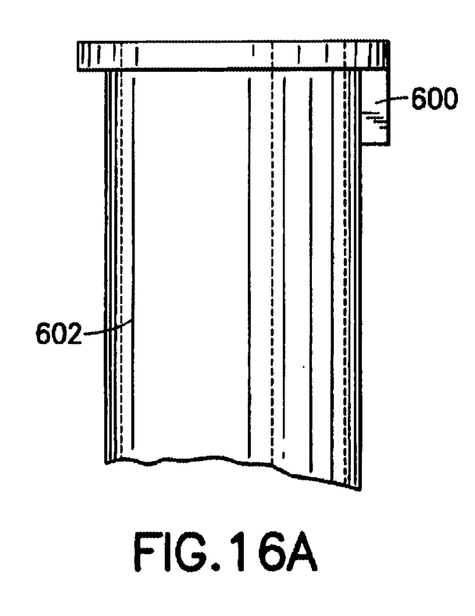
FIGS. 16(A) and 16(B) are side elevational and top plan views, respectively, of an alternative cylindrical insert.
Figure 16B:
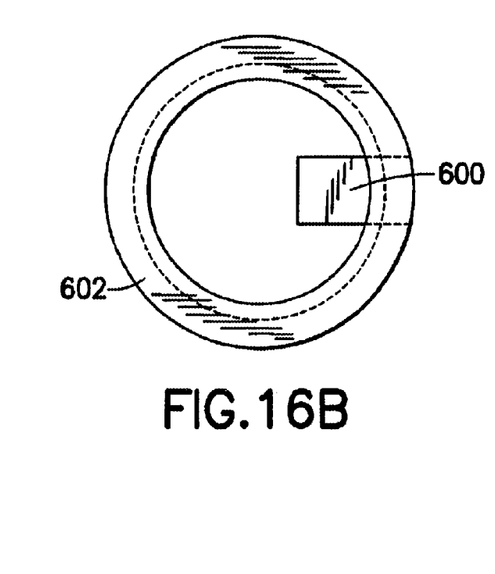
Figure 17:
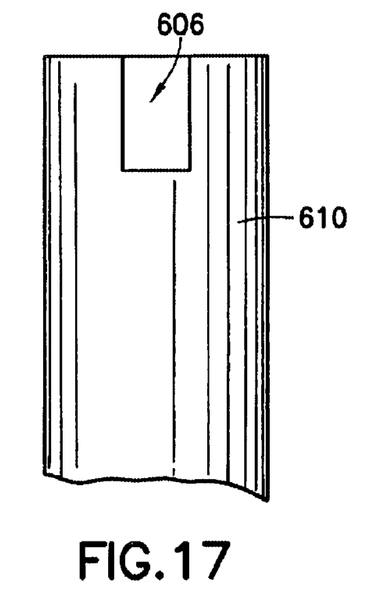
FIG. 17 is an end elevational view of a bicycle seat tube for use with the cylindrical insert of FIGS. 16(A) and 16(B).

Referring now to FIGS. 16(A), 16(B), and 17 together, there is illustrated an alternative arrangement to prevent swivel. Here, a vertical protrusion 600 in a cylindrical insert 602 extends outwardly of the wall of the cylindrical insert at the upper end thereof. This outward extension closely fits into a slot 606 defined in a bicycle seat tube 610 to prevent swiveling of the cylindrical insert. This arrangement is most applicable to those situations in which the manufacturer of the bicycle installs the shock-absorbing system, although retrofitting is not precluded.

Figure 18:
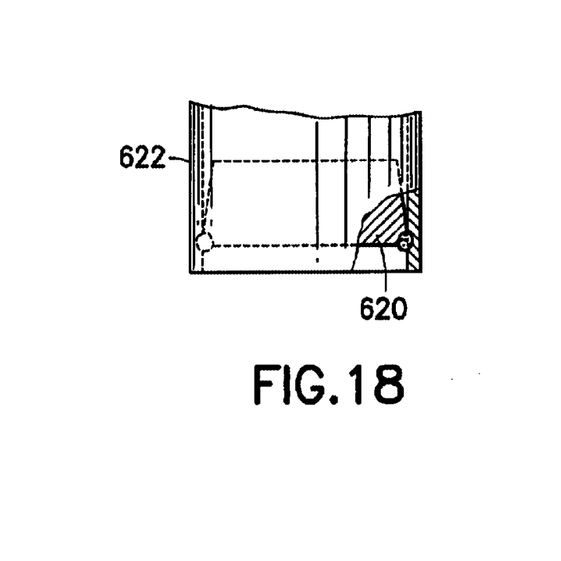
FIG. 18 is a side elevational view of a plug for supporting a shock-absorbing spring system.

FIG. 18 illustrates a load support plug 620 welded into a bicycle seat tube 622 prior to attachment of the seat tube to a hub (not shown). This arrangement would be most suitable in those situations in which the manufacturer of the bicycle installs the shock-absorbing system.

Figure 19:
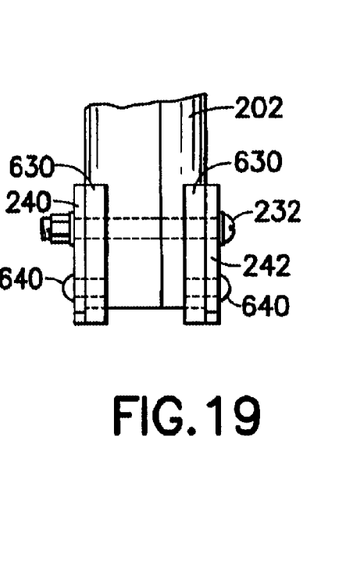
FIG. 19 is an end elevational view of reinforcement members disposed at a lower end of a bicycle seat tube.

FIG. 19 illustrates bolt 232 and bicycle seat tube 202 described above with reference to FIG. 4 and support pillars 240 described above with reference to FIGS. 11 and 12 and also illustrates arcuate reinforcing members 630 disposed circumjacently against the bicycle seat tube inwardly of the support pillars. Reinforcement members 630 are attached to bicycle seat tube 202 by means of bolt 232 and suitable fasteners 640 and provide additional reinforcing of the lower end of bicycle seat tube 202.

Figure 20:
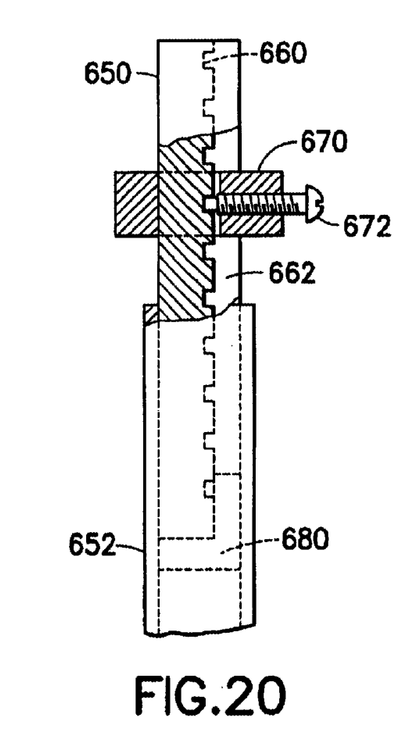
FIG. 20 is a side elevational view, partially cutaway, showing means to provide a minimum bicycle seat post elevation and means to prevent ejection of the bicycle seat post from a bicycle seat tube.

FIG. 20 illustrates a slotted bicycle seat post 650 inserted in a bicycle seat tube 652. A plurality of indents, as at 660, is defined in the inner surface of vertical slot 662. An annular collar 670 is disposed around bicycle seat post 650, the collar having a threaded fastener 672 inserted therethrough and into a selected one of indents 660, and the collar having dimensions such that it can rest on the top of bicycle seat tube 652. Thus arranged, the minimum height of bicycle seat post 650 can be selectively fixed.

FIG. 20 also illustrates vertical slot 662 extending the full length of bicycle seat post 650. This is a more economical manufacturing arrangement than having vertical slot 662 terminate at some point short of the lower end of bicycle seat post 650. To prevent ejection of bicycle seat post 650 from bicycle seat tube 652, a plug 680 is inserted into the lower end of vertical slot 662 to engage the key protrusion (not shown on FIG. 20).

Figure 21A:
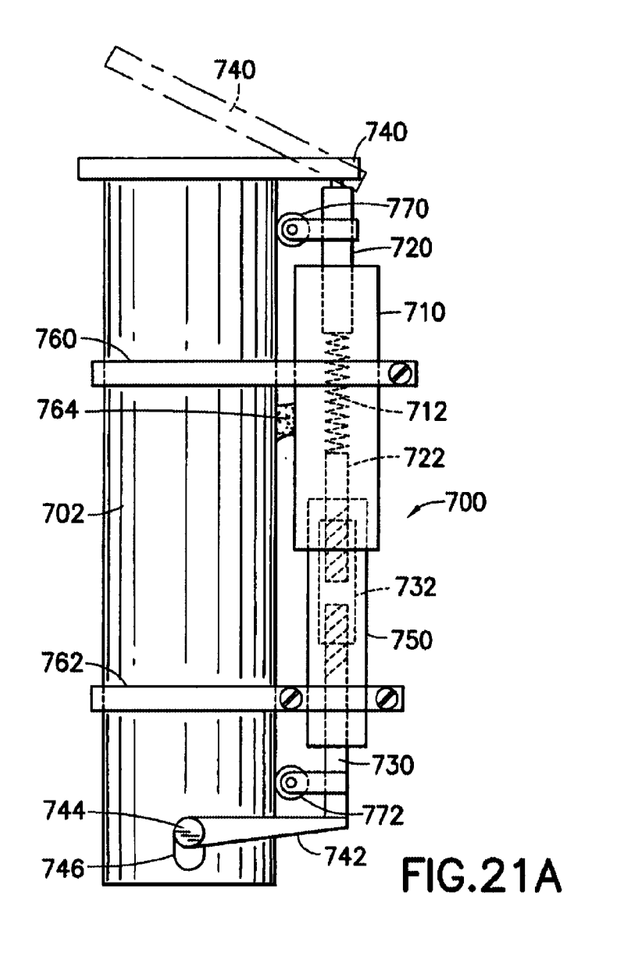
FIGS. 21(A) and 21(B) are side elevational and end elevational views, respectively, of one embodiment of a tension spring arrangement for use in a bicycle seat mount shock-absorbing system.

FIG. 21(A) illustrates one embodiment of a tension spring arrangement for use in a bicycle seat mount shock-absorbing system, generally indicated by the reference numeral 700, and attached to a bicycle seat tube 702. Tension spring arrangement 700 includes a first vertical tube 710 having disposed therein a tension spring 712. The upper end of tension spring 712 is attached to the lower end of a first rod 720 and the lower end of tension spring 712 is attached to the upper end of a second rod 722. The lower end of second rod 722 and the upper end of a third rod 730 are threadedly attached to a turnbuckle 732. The upper end of first rod 720 is attached to a collar 740 fixedly disposed around bicycle seat tube 702, while the lower end of third rod 730 is attached to a yoke 742 which, in turn, is attached to the ends of a support rod 744 protruding through the wall of the bicycle seat tube through vertical slots 746 (only one shown on FIG. 21(A)) which may be provided with a flexible cover. A second vertical tube 750 telescoping inserted into the lower end of first vertical tube permits access to turnbuckle 732 for the adjustment thereof and provides for an adjustable total length of tension spring arrangement 700 that is suitable for emplacement along bicycle seat tube 702 of any originally manufactured bicycle. Upper and lower clamps 760 and 762, respectively, may be provided for the attachment of tension spring arrangement 700 to bicycle seat tube 702 and/or the arrangement may be attached by means of a weld 764. Support rod 744 supports internal compression spring components which may be similar to those described above with reference to FIG. 4 or the internal compression spring components may be of other types. In any case, tension spring arrangement 700 may be provided to assist the internal compression spring in its shock absorbing purpose. Upper and lower sliding means 770 and 772, respectively, may be provided between bicycle seat tube 702 and first and third rods 720 and 730 and may consist of rollers, wheels, low-friction plastic blocks, or the like.

Figure 21B:
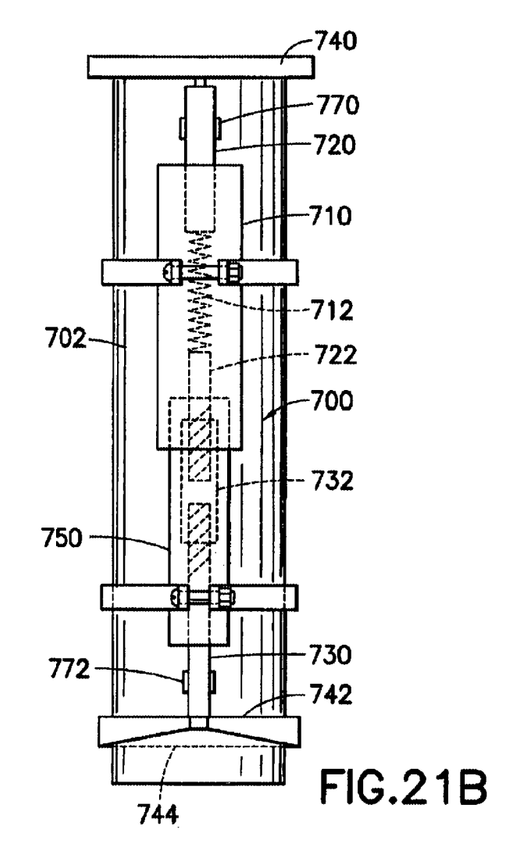

FIG. 21(B) illustrates the same components of tension spring arrangement 700, except weld 764 is not visible and upper and lower clamps 760 and 762 have been omitted.

Figure 22A:
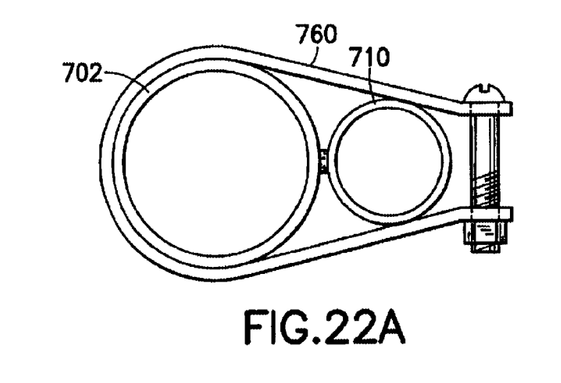
FIGS. 22(A) and 22(B) are top plan views of clamps that may be used to attach the tension spring system to a bicycle seat tube.
Figure 22B:
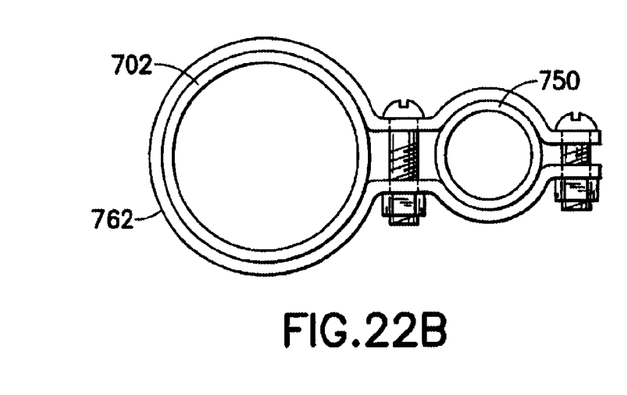

FIG. 22(A) illustrates in more detail the components of upper clamp 760 attaching first tube 710 to bicycle seat tube 702, while FIG. 22(B) illustrates in more detail the components of lower clamp 762 attaching second tube 750 to the bicycle seat tube.

Figure 23:
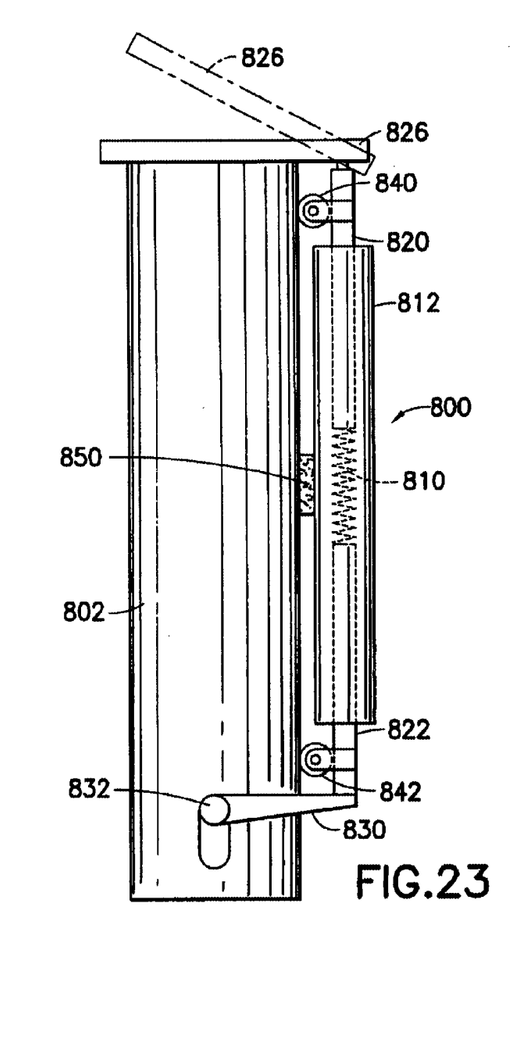
FIG. 23 is a side elevational view of another embodiment of a tension spring arrangement for use in a bicycle seat mount shock-absorbing system.

FIG. 23 illustrates a more simplified tension spring arrangement, generally indicated by the reference numeral 800, as compared with tension spring arrangement 700 (FIGS. 21(A) and 21(B)). Tension spring arrangement 800 includes a tension spring 810 disposed in a vertical tube 812. The upper end of tension spring 810 is attached to the lower end of an upper rod 820, while the lower end of the tension spring is attached to the upper end of a lower rod 822. The upper end of upper rod 820 is attached to a collar 826 disposed around bicycle seat tube 802, while the lower end of lower rod 822 is attached to a yoke 830 which, in turn, is attached to the ends of a support rod 832 protruding through a vertical slot formed in bicycle seat tube 802. Upper and lower sliding means 840 and 842 may be provided, respectively, between bicycle seat tube 802 and upper rod 820 and lower rod 822. Vertical tube 812 may be attached to bicycle seat tube 802 by means of weld 850.

Tension spring arrangement 800 is applicable in OEM bike manufacture where the length of bicycle seat tube 802 is known and no adjustment of the total length of tension spring arrangement is required, as would be required for retrofitting in a variety of bicycle seat tube lengths.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objectives set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A shock-absorbing bicycle seat mount, comprising:
   (a) a post fixedly attached to a bicycle seat at a proximal end of said post, a distal end of said post being inserted into a bicycle seat tube for axial movement therein;
   (b) biasing means disposed within said seat tube to support said post and provide a cushioning action for said post and said bicycle seat;
   (c) means to prevent rotational movement of said post within said seat tube;
   (d) at least a first cylindrical insert disposed between an outer peripheral surface of said post and an inner peripheral surface of said seat tube;
   (e) an annular flange disposed around an upper end of said at least a first cylindrical insert to prevent said at least a first cylindrical insert from falling into said bicycle seat tube;

(f) a tab depending from a lower surface of said annular flange, with a first hole defined through said tab;

(g) a ring clamp for clamping around an outer periphery of said bicycle seat tube, said ring clamp having defined through ends thereof a pair of aligned second holes; and (h) said first and second holes being arranged such that when a fastener is inserted through said first hole and said second holes to tighten said ring clamp, said at least a first cylindrical insert will be held against rotational movement with respect to said bicycle seat tube.

2. A shock-absorbing bicycle seat mount, as defined in claim 1, further comprising: a third additional hole defined through said tab vertically spaced apart from said first hole such that said ring clamp may be selectively positioned along said bicycle seat tube.

3. A shock-absorbing bicycle seat mount, comprising:

(a) a post fixedly attached to a bicycle seat at a proximal end of said post, a distal end of said post being inserted into a bicycle seat tube for axial movement therein;

(b) biasing means disposed within said seat tube to support said post and provide a cushioning action for said post and said bicycle seat;

(c) means to prevent rotational movement of said post within said seat tube;

(d) support means comprising a bolt inserted through said bicycle seat tube; and (e) support pillars attached to said bicycle seat tube by said bolt and extending downwardly to be supported by a crank hub of said bicycle.

4. A shock-absorbing bicycle seat mount, as defined in claim 3, further comprising: arcuate reinforcing members disposed between said support pillars and said bicycle seat tube to reinforce a lower end of said bicycle seat tube.

5. A shock-absorbing bicycle seat mount, comprising:

(a) a post fixedly attached to a bicycle seat at a proximal end of said post, a distal end of said post being inserted into a bicycle seat tube for axial movement therein;

(b) biasing means disposed within said seat tube to support said post and provide a cushioning action for said post and said bicycle seat;

(c) means to prevent rotational movement of said post within said seat tube;

(d) at least a first cylindrical insert disposed between an outer peripheral surface of said post and an inner peripheral surface of said seat tube;

(e) an annular flange formed around an upper end of said at least a first cylindrical insert;

(f) target means formed in said annular flange; and (g) a screw aligned with said target means and inserted through said bicycle seat tube and into protrusion means integral with said at least a first cylindrical insert thereby to secure said bicycle seat post from rotational movement with respect to said bicycle seat tube.

6. A shock-absorbing bicycle seat mount, comprising:

(a) a post fixedly attached to a bicycle seat at a proximal end of said post, a distal end of said post being inserted into a bicycle seat tube for axial movement therein;

(b) biasing means disposed within said seat tube to support said post and provide a cushioning action for said post and said bicycle seat;

(c) at least a first cylindrical insert disposed between an outer peripheral surface of said post and an inner peripheral surface of said seat tube;

(d) said post having a lengthwise slot defined in a surface thereof and said at least a first cylindrical insert having a lengthwise protrusion extending inwardly therefrom, said slot and said protrusion having complementary shapes such that said slot and said protrusion will slidingly engage each other and prevent relative rotation between said post and said at least a first cylindrical insert; and (e) a tab formed as an extension of said protrusion and extending outwardly from an outer surface of said at least a first cylindrical insert at an upper end thereof and a slot defined in a wall of said seat tube at an upper end thereof, said tab and said slot having complementary shapes, such that when tab is inserted in said slot, relative rotation between said at least a first cylindrical insert and said seat tube is prevented.

7. A bicycle seat tube, defined as that part of a bicycle frame into which a dimensionally conforming bicycle seat post is inserted, that said seat tube structurally comprises a] a circumferentially reduced annular space in it's upper portion and b] said annular space configured to enclose a lengthwise portion of said seat post's circumferential configuration and c] said annular space configured to provide unrestricted linear motion of the seat post for it's true longitudinal movement in the seat tube and d] said annular space including integral protrusion means for prevention of lateral, rotational motion of the seat post and e] a platform within the seat tube at it's lower portion and f] said platform enabled to support a force loading from the seat post and any biasing means and ancillary components within the seat tube upon which the seat post is positioned and g] diametrically opposite openings at a lower portion of the seat tube wail through which the platform may extend outward of the seat tube wail and h] said openings configured to allow for fixed positioning or longitudinal movement of the platform when connected to support means exterior to the seat tube for such purpose.

* * * * *